(12) United States Patent
Shibata et al.

(10) Patent No.: US 6,517,764 B2
(45) Date of Patent: Feb. 11, 2003

(54) METHOD OF MAKING POLYETHYLENE RESINOUS OPEN CELL CELLULAR BODIES

(75) Inventors: Tomoyoshi Shibata, Kyoto (JP); Yoshio Miyano, Kyoto (JP); Kazuyoshi Fujimura, Kyoto (JP)

(73) Assignee: Sanwa Kako Co., Ltd., Kyoto (JP)

( * ) Notice: Subject to any disclaimer, the term of this patent is extended or adjusted under 35 U.S.C. 154(b) by 39 days.

(21) Appl. No.: 09/779,862

(22) Filed: Feb. 8, 2001

(65) Prior Publication Data

US 2001/0042943 A1 Nov. 22, 2001

(30) Foreign Application Priority Data

Feb. 10, 2000 (JP) ........................... 2000-038140
Apr. 27, 2000 (JP) ........................... 2000-132839

(51) Int. Cl.⁷ ..................... B29C 44/02; B29C 67/20
(52) U.S. Cl. ..................... 264/424; 264/54; 264/321
(58) Field of Search ..................... 264/51, 54, 321, 264/424

(56) References Cited

U.S. PATENT DOCUMENTS

| | | | | |
|---|---|---|---|---|
| 4,142,956 A | * | 3/1979 | Shikinami et al. | 521/50.5 |
| 4,435,346 A | * | 3/1984 | Ito et al. | 264/54 |
| 4,448,738 A | * | 5/1984 | Crocker | 264/54 |
| 4,607,060 A | * | 8/1986 | Kmiec et al. | 521/89 |
| 5,407,965 A | * | 4/1995 | Park et al. | 521/81 |
| 6,103,154 A | * | 8/2000 | Branger et al. | 264/54 |
| 6,140,380 A | * | 10/2000 | Mauk et al. | 521/385 |

FOREIGN PATENT DOCUMENTS

| | | |
|---|---|---|
| JP | 56-146732 A | 11/1981 |
| JP | 59-23545 B2 | 6/1984 |
| JP | 60-55290 B2 | 12/1985 |
| JP | 62-19294 B2 | 4/1987 |
| JP | 2-22345 A | 1/1990 |
| JP | 3-8379 B2 | 2/1991 |
| JP | 10-279724 A | 10/1998 |
| JP | 1-44499 B2 | 9/1999 |
| JP | 11-315161 A | 11/1999 |

* cited by examiner

Primary Examiner—Allan R. Kuhns
(74) Attorney, Agent, or Firm—Frishauf, Holtz, Goodman & Chick, P.C.

(57) ABSTRACT

A method is disclosed that makes a open cell cellular body of polyethylene resin material in non-crosslinked structure, which has a maximum degree of cell interconnection, is good in recyclability and excellent in heat resistance or resistance to heat distortion. The method includes the steps of adding 4,4'-oxy bis (benzene sulfonyl hydrazide) to a polyethylene resin material to form a foamable composition and shaping the foamable composition of polyethylene resin material, heating the shaped foamable composition of polyethylene resin material to be foamed under an atmospheric pressure to form a cellular body thereof with cells therein, and mechanically deforming the cellular body of polyethylene resin material to cause the cells therein to be interconnected, thereby producing the open cell cellular body desired. The produced continuous cellular body is rendered heat resistant by irradiating the same or the formed cellular body with a beam of electrons.

17 Claims, No Drawings

METHOD OF MAKING POLYETHYLENE RESINOUS OPEN CELL CELLULAR BODIES

BACKGROUND OF THE INVENTION

1. Field OF The Invention

The present invention relates to a method of making polyethylene resinous open cell cellular bodies, in particular a polyethylene resin open cell cellular body that is excellent in both recyclability and heat resistance and further has a maximum degree of cell interconnection.

2. Description of the Prior Art

There has hitherto been proposed in the art, as disclosed in patent literatures JP SHO 59-23545 A and JP SHO 56-146732 A, a method of making a polyethylene resin open cell cellular body by partially decomposing a foaming (expanding) and a crosslinking agent in a foamable and crosslinkable composition of polyethylene resin material in a closed mold, then decomposing the remaining parts of the foaming and crosslinking agents under an atmospheric pressure to obtain a body with closed cells from the composition, and finally compressing the thus obtained body to cause the closed cells to be destructed.

In this conventional method, while the composition is in the closed mold in which the foaming and crosslinking agents are heated under pressure to be partially decomposed, crosslinking reaction does occur but foaming or cell formation does not take place. The foaming takes place after pressure removal. In the method, therefore, in which crosslinking completely precedes cell formation, i.e., chemical links have already been established in the process step of forming closed cells, the cell membrane becomes strong, tough and tenacious. As a result, the subsequent compressing step is difficult to interconnect isolated cells to be unable to yield a cellular body that has a degree of cell interconnection of 100% or even approaching 100%.

We have proposed several techniques designed to solve these problems met by the prior method mentioned above. These include a method as disclosed in JP SHO 62-19294 B and JP HEI 1-44499 B in which a foamable and crosslinkable composition having its base composed of ethylene acetate copolymer or low density polyethylene is heated and preformed into a preselected shape and then under atmospheric pressure is heated to cause a foaming and a crosslinking agent in the composition to be decomposed simultaneously to form a cellular body having cells therein and the cellular body is then mechanically deformed to cause the cells to be interconnected therein. In another method that we have proposed, a polyethylene resin open cell cellular material as disclosed in JP HEI 2-22345 A is further irradiated with a beam of electrons, thereby imparting heat resistance thereto. In a further method as we have disclosed in JP HEI 11-315161, a foamable and crosslinkable composition having its base composed of polyethylene derived from polymerization of ethylene catalyzed by a metallocene is heated and preformed and then under atmospheric pressure is heated to cause to a foaming and a crosslinking agent in the composition to be decomposed simultaneously to form a cellular body having cells therein, the cellular body being then mechanically deformed to cause the cells to be interconnected therein.

These methods permit making an open cell cellular body as desired that has a degree of cell interconnection as high as or nearly 100%. Despite its satisfactory degree of cell interconnection, however, a body made by any of the methods mentioned has been found still unsatisfactory. First, its crosslinked structure does not allow remelting a body on recovery after use and thus makes it unsuitable for recycling. Second, use of an ethylene acetate copolymer leaves an open cell cellular body still relatively poor in heat resistance by having a change in dimensions according to JIS K 6767 as much as −10 to −20% at 70° C.

Proposals have also been made to make non-crosslinkable, polyethylene resin open cell cellular bodies. For example, JP SHO 60-55290 B discloses an exclusion method in which a low-density and a high-density polyethylene are mixed together on specifying their melt indices and mixing ratio, and the mixture is mixed with a volatile organic liquid for exclusion on specifying a particular extrusion temperature. JP HEI 3-8379 B discloses a method in which an olefin resin is mixed with an ionic copolymer and a foaming agent to form a resinous composition, and then the composition is excluded and foamed. In a method disclosed in JP P 10-279724, a polyolefin resin is mixed with a resinous composition of an ethylene-methacrylic acid copolymer (ionomer resin), a nucleation agent and an anti-shrink agent, which upon softening or melting by heating is supplied and mixed with a volatile foaming agent, to form a composition, and then the composition is excluded into a low pressure region.

Open cell cellular bodies made by these latter methods are indeed good in recyclability, but are poor in the degree of cell interconnection and therefore are unsuitable for use as carriers in an organism filtration tank included in an organic filterable water-purifier tank system and as a filter, which are important applications of such bodies.

SUMMARY OF THE INVENTION

It is accordingly an object of the present invention to solve the above mentioned problems met by the prior art and to provide a method of making a polyethylene resin open cell cellular body that is excellent in both recyclability and heat resistance or resistance to heat distortion and further has a maximum degree of cell interconnection.

In order to achieve the object mentioned above there is provided in accordance with the present invention in a first aspect thereof a method of making a polyethylene resin open cell cellular body, characterized in that it comprises the steps of: preparing a polyethylene resin material that is derived from polymerization of ethylene catalyzed by a metallocene compound; adding 4,4'-oxy bis (benzene sulfonyl hydrazide) to the polyethylene resin material to form a foamable composition and shaping the foamable composition of polyethylene resin material; heating the shaped foamable composition of polyethylene resin material to be foamed under an atmospheric pressure to form a cellular body thereof with cells therein; and mechanically deforming the said cellular body of polyethylene resin material to cause the cells to be interconnected therein, thereby producing the open cell cellular body of polyethylene resin material.

The present invention also provides in a second aspect thereof a method of making a polyethylene resin open cell cellular body, characterized in that it comprises the steps of: preparing a polyethylene resin material that is an ethylene-vinyl acetate copolymer; adding 4,4'-oxy bis (benzene sulfonyl hydrazide) to the polyethylene resin material to form a foamable composition and shaping the foamable composition of polyethylene resin material; heating the shaped foamable composition of polyethylene resin material to be foamed under an atmospheric pressure to form a cellular body thereof with cells therein; and mechanically deforming the said cellular body of polyethylene resin material to cause the cells to be interconnected therein, thereby producing the open cell cellular body of polyethylene resin material. In a preferred form of embodiment of the present invention in this aspect, the ethylene-vinyl acetate copolymer contains not less than 5% of vinyl acetate. It has been found that if the ethylene-vinyl acetate copolymer contains less than 5% of vinyl acetate, the foam breakability of the cellular body is significantly lowered, presumably by reason of stiffness properties of the resin.

In a specific form of embodiment of the present invention in either the first or second aspect thereof mentioned above, it is preferable that the fomable composition be freely foamed in three-dimensional directions under the atmospheric pressure. Otherwise, it has been found that there develops in the mold a pressure that acts to compress the composition, thus to hinder its foaming and to cause it to shrink.

The present invention also provides in a third aspect thereof a method of making a polyethylene resin open cell cellular body, characterized in that it comprises the steps of: adding 4,4'-oxy bis (benzene sulfonyl hydrazide) to a polyethylene resin material to form a foamable composition and shaping the foamable composition of polyethylene resin material; heating the shaped foamable composition of polyethylene resin material to be foamed under an atmospheric pressure to form a cellular body thereof with cells therein; mechanically deforming the said cellular body of polyethylene resin material to cause the cells to be interconnected therein, thereby producing the open cell cellular body of polyethylene resin material; and irradiating the produced open cell cellular body of polyethylene resin material with a beam of electrons, thereby rendering the same heat-resistant or resistant to heat distortion.

The present invention also provides in a fourth aspect thereof a method of making a polyethylene resin open cell cellular body, characterized in that it comprises the steps of: adding 4,4'-oxy bis (benzene sulfonyl hydrazide) to a polyethylene resin material to form a foamable composition and shaping the foamable composition of polyethylene resin material; heating the shaped foamable composition of polyethylene resin material to be foamed under an atmospheric pressure to form a cellular body thereof with cells therein; and mechanically deforming the cellular body of polyethylene resin material to cause the cells to be interconnected therein, thereby producing the open cell cellular body of polyethylene resin material, wherein the produced open cell cellular body of polyethylene resin material is rendered heat-resistant or resistant to heat distortion by irradiating the formed cellular body prior to mechanical deformation, with a beam of electrons.

The present invention is based on the recognition that a foaming agent 4,4'-oxy bis (benzene sulfonyl hydrazide) is low in decomposition temperature and high in rate of decomposition. It has now been found that this particular foaming agent if applied to the purposes of the present invention is highly suitable for forming a polyethylene resin open cell cellular body of the desired properties. The foaming agent has been found to leave its decomposed residue that has enough power advantageously to hold foam forming gases and to permit foaming to an increased extent even in a non-crosslinked structure. The decomposed residue has further been found to be effective to promote increasing the heat resistance or resistance to heat distortion of the cellular body produced.

For the polyethylene resin material in the present invention, use may be made suitably of a polyethylene resin that is derived from polymerization of ethylene catalyzed by a metallocene compound, an ethylene-vinyl acetate copolymer, a high pressure processed low density polyethylene, and so forth. A polyethylene resin that is derived from polymerization catalyzed by a metallocene compound is made up of a copolymer of ethylene and one or more α-olefins of $C_3$ to $C_{18}$, which may, for example, be propylene, 1-butene, 1-pentene, 1-hexene, 4-methyl-1-pentene, and 1-octene. Among the various polyethylene resins, a polyethylene resin that is derived from polymerization of ethylene catalyzed by a metallocene compound, and an ethylene-vinyl acetate copolymer are particularly preferable in respect of the flexibility of an open cell cellular body.

A metallocene catalyst in general is a compound having a structure in which a transition metal is sandwiched by unsaturated compounds of $\pi$ electron system. In the present invention, there are mentioned compounds having tetravalent transition metals such as titanium, zirconium, nickel, palladium, hafnium and platinum together with one or more cyclopentadienyl rings or their family members as ligands.

For ligands other than cyclopentadienyl rings, mention may be made of, for example, a cyclopentadienyl oligomer ring, indenyl ring, or cyclopentadienyl or indenyl ring having substitution with a hydrocarbon radical, substitution hydrocarbon radical or hydrocarbon substituted metalloid radical. Other than these ligands, for example monovalent chlorine or bromine anion, bivalent anion chelate, hydrocarbon radical, alkoxide, aryl-alkoxide, aryl-oxide, amide, aryl-amide, phosphide or aryl-phosphide may be coordinated and bonded to a transition metal.

These and other features, objects and advantages will be understood or apparent to those of ordinary skill in the art from the following detailed description of the preferred forms of embodiment.

DETAILED DESCRIPTION OF THE INVENTION

The present invention will hereinafter be described in conjunction with suitable forms of embodiment thereof for methods of making an open cell cellular body.

First Form of Implementation of the Invention 100 parts by weight of a polyethylene resin that is derived from polymerization of ethylene catalyzed by a metallocene compound and/or an ethylene-vinyl acetate copolymer have added thereto preferably 1 to 30 parts by weight of a foaming agent 4,4'-oxy bis (benzene sulfonyl hydrazide) and also where necessary a bulking agent and a pigment. The resultant composition is kneaded by a heated mixing roll, pressure kneader, extruder or the like.

In the present invention, in order to improve the physical properties of a composition used, to function as a nucleator (to uniform and to make smaller gas bubbles), to improve defoaming and to reduce the cost, one or more additives (bulking agent or filler) may if necessary be added that do not much adversely affect the decomposition reactions of the foaming agent and that do not crosslink the resin, for example, a metal oxide such as zinc oxide, titanium oxide, calcium oxide, magnesium oxide or silicon oxide, a carbonate such as magnesium carbonate or calcium carbonate, or a fibrous material such as pulp, any of various dyes, pigments, fluorescent materials and rubber compounding ingredients of common use and so forth.

A foamable composition that is obtained in a manner as described above is loaded into a mold and under a pressure applied by a press is heated to a temperature in excess of a melting point of the resin and thereby shaped. This heat-shaping process is a process step by which the composition acquires a given shape and in which the foaming agent 4,4'-oxy bis (benzene sulfonyl hydrazide) does not materially decompose. Although a very small amount of the foaming agent initially decomposes to an extent that the formed body may expand twice in volume when removed from the mold, this is far from the concept of foaming and has no objection to the present invention.

Subsequent heating of the foamable composition so formed as described above under an atmospheric pressure decomposes the foaming agent 4,4'-oxy bis (benzene sulfonyl hydrazide). This heating under the atmospheric pressure may be carried out in a hot-air temperature controlled bath, by heating with a heater attached fast to the outer surface of a metal plate, by jacket heating with a vapor or heated oil, or in an oil, metal or salt bath.

In the present invention, atmospheric foaming as described is preferably effected freely in three-dimensional directions. It is also preferable that the lower surface of the foamable composition be laid on an anti-friction material or lubricant such as talc so that resistance to foaming may not develop. The lower surface may have applied thereto a metal plate of iron or aluminum, a metal net, a fiber net or any of various sheets surface-processed with polytetrafluoroethylene.

The temperature for heating is set in a range, preferably of 140 to 180° C., more preferably of 145 to 175° C., depending on the type of a resin used. The time period for heating is preferably from 5 to 40 minutes, more preferably from 10 to 35 minutes. A decomposed residue of 4,4'-oxy bis (benzene sulfonyl hydrazide) tends to blacken at high temperature for long time period. Thus, heating the composition at a higher temperature and/or for a longer time period than those mentioned above blackens a resultant cellular body.

In this manner, a cellular body is obtained that has a cell membrane that can readily be ruptured if the cellular body is mechanically deformed.

A thus obtained cellular body with closed cells is next compressed and deformed using, for example, even speed rolls whereby the cell membranes are broken and an open cell cellular body is obtained with the interconnection of cells. The even speed rolls may have on their surfaces a quite large number of needles, or may be provided in their front and/or back with a roll or rolls having a very large number of needles on their surface so that these needles puncture a countless number of holes in the surface of the foam therewith, thereby facilitating interconnection of the cells.

Measuring thus obtained open cell cellular bodies with an air comparison type density meter model 1000 of Tokyo Science Inc. complying with ASTM D 2856 indicates a degree of cell interconnection of 100% or nearly 100%.
Examples of First Form of Implementation While the present invention in this form of implementation is hereinafter described in further detail specifically with respect to certain examples thereof summarized in Table 1 given and comparative examples summarized in Table 2 given below Table 1, it should be noted that these Examples are intended in no way to limit the present invention.

EXAMPLE 1

A composition made of 100 parts by weight of a polyethylene resin specified by trade name: Karnel KS240 manufactured by Nippon PolyChem Kabushiki Kaisha, having a density (D) of 0.880 g/cm$^3$, an MFR of 2.2 g/(10 minutes) and a melting point of 60° C., which is derived from polymerization of ethylene catalyzed by a metallocene, and 10 parts by weight of 4,4'-oxy bis (benzene sulfonyl hydrazide) specified by trade name: Neocellbon N#5000 manufactured by Eiwa Kasei Kogyo Kabushiki Kaisha, having a temperature of decomposition of 164° C. is kneaded using a mixing roll at a temperature of 85° C. The resultant composition is filled in a mold (5×200×200 mm) in a press heated to 110° C. and on closure is heated at this temperature for a period of 2 minutes for shaping, yielding a foamable sheet that is then cooled to a room temperature and removed from the mold.

The shaped foamable sheet is placed on a metal plate covered thin with a talc powder and is heated at a temperature of 160° C. for a period of 20 minutes in a circulating air oven to obtain a cellular body.

The cellular body obtained is passed twice between even speed rolls with a set spacing of 2 mm to break cell membranes and thus to interconnect the cells therein. An open cell cellular body thus obtained has a size of 11×470×470 mm, an apparent density of 0.073 g/cm$^3$ and a degree of cell interconnection of 100%, and shows a uniform distribution of cells.

EXAMPLE 2

This Example is carried out in the same blending and foaming conditions as Example 1 except that 4,4'-oxy bis (benzene sulfonyl hydrazide) in Example 1 has 20 parts by weight.

An open cell cellular body obtained in this Example has a size of 12×550×550 mm, an apparent density of 0.049 g/cm$^3$ and a degree of cell interconnection of 100%, and shows a cell distribution that is substantially uniform.

EXAMPLE 3

This Example is carried out in the same blending and foaming conditions as Example 1 except that the polyethylene resin in Example 1 derived from polymerization catalyzed by a metallocene compound is replaced by a polyethylene resin specified by trade name Karnel KS340 manufactured by Nippon PolyChem Kabushiki Kaisha, having a density of 0.880 g/cm$^3$, an MFR of 3.5 g/(10 minutes) and a melting point of 60° C.

An open cell cellular body obtained in this Example has a size of 13×430×430 mm, an apparent density of 0.071 g/cm$^3$ and a degree of cell interconnection of 100%, and shows a cell distribution that is substantially uniform.

EXAMPLE 4

This Example is carried out in the same blending and foaming conditions as Example 3 except that 4,4'-oxy bis (benzene sulfonyl hydrazide) in Example 3 has 20 parts by weight.

An open cell cellular body obtained in this Example has a size of 14×520×520 mm, an apparent density of 0.046 g/cm$^3$ and a degree of cell interconnection of 100%, and shows a cell distribution that is substantially uniform.

EXAMPLE 5

This Example is carried out in the same blending and foaming conditions as Example 1 except that the resin used in Example 1 is replaced by an ethylene acetate copolymer specified by trade name Novatec LV540 manufactured by Nippon PolyChem Kabushiki Kaisha, having a density of 0.942 g/cm$^3$, an MFR of 2.5 g/(10 minutes), a melting point of 83° C. and a content of vinyl acetate of 20% by weight, that 4,4'-oxy bis (benzene sulfonyl hydrazide) used in Example 1 has 20 parts by weight and that a cellular body with closed cells is passed ten times between the even speed rolls.

An open cell cellular body obtained in this Example has a size of 21×460×460 mm, an apparent density of 0.043 g/cm$^3$ and a degree of cell interconnection of 95%, and shows a cell distribution that is substantially uniform.

COMPARATIVE EXAMPLE 1

This Example is carried out in the same blending and foaming conditions as Example 1 except that 10 parts by weight of 4,4'-oxy bis (benzene sulfonyl hydrazide) used in Example 1 is replaced by 3.0 parts by weight of azodicarbonamide, and 2.0 parts by weight of active zinc oxide and 1.0 part of zinc stearate are added to composition. However, a good cellular body can not be obtained because a composition shrinks with atmospheric foaming.

TABLE 1

| Example | | 1 | 2 | 3 | 4 | 5 |
|---|---|---|---|---|---|---|
| Resin | Type | Metallocene type PE | Metallocene type PE | | | EVA |
| | Grade | Karnel KS240 | Karnel KS340 | | | Novatec LV540 |
| | Density (g/cm$^3$) | 0.880 | 0.880 | | | 0.942 |
| | MFR (g/10 min.) | 2.2 | 3.5 | | | 2.5 |
| | Melting point (° C.) | 60 | 60 | | | 83 |
| | VAC (%) | — | — | | | 20 |
| OBSH blending parts in number | | 10 | 20 | 10 | 20 | 20 |
| Shaping conditions | Mold size (mm × mm × mm) | 5 × 200 × 200 mm | | | | |
| | Heating temperature | 110° C. | | | | |
| | Heating time period | 2 minutes | | | | |
| Foaming conditions | Heating temperature | 160° C. | | | | |
| | Heating time period | 20 minutes | | | | |
| Cell interconnection | Roll spacing | 2 mm | | | | |
| | Number of passages | | 2 | | 2 | 10 |
| Open cell cellular body | Size (mm × mm × mm) | 11 × 470 × 470 | 12 × 550 × 550 | 13 × 430 × 430 | 14 × 520 × 520 | 21 × 460 × 460 |
| | Apparent density (g/cm$^3$) | 0.073 | 0.049 | 0.071 | 0.046 | 0.043 |
| | Degree of cell interconnection (%) | 100 | 100 | 100 | 100 | 95 |

TABLE 2

| Comparative Example | | 1 |
|---|---|---|
| Resin | Type | Metallocene type PE |
| | Grade | Karnel KS240 |

TABLE 2-continued

| Comparative Example | | 1 |
|---|---|---|
| | Density (g/cm$^3$) | 0.880 |
| | MFR (g/10 min.) | 2.2 |
| | Melting Point (° C.) | 60 |
| | VAC (%) | — |
| OBSH blending parts in number | | 0 |
| Azodicarbonamide blending parts in number | | 3 |
| Zinc oxide blending parts in number | | 2 |
| Zinc stearate blending parts in number | | 1 |
| Shaping conditions | Mold size (mm × mm × mm) | 5 × 200 × 200 mm |
| | Heating temperature | 110° C. |
| | Heating time period | 2 minutes |
| Foaming conditions | Heating temperature | 160° C. |
| | Heating time period | 20 minutes |
| Cell interconnection | Roll spacing | 2.0 mm |
| | Number of passages | 10 |
| Open cell cellular body | Size (mm × mm × mm) | 15 × 380 × 380 |
| | Apparent density (g/cm$^3$) | 0.085 |
| | Degree of cell interconnection % | 60 |
| Remarks | | Shrunk |

It is seen that according to the present invention, the use as a foaming agent of 4,4'-oxy bis (benzene sulfonyl hydrazide) and as a base material of either a polyethylene resin derived from polymerization catalyzed by a metallocene compound, which possesses a sharp distribution of polymerized molecular weights and uniform properties, or an ethylene acetate vinyl copolymer, permits yielding a polyethylene resin open cell cellular body that is structurally non-crosslinked, is maximum in cell interconnection and has good recyclability. Since polyethylene resin open cell cellular bodies which the method of this invention yields are thus highly suitable for use as filters, carriers in a clarifier tank and as an anti-condensation material in an air-conditioner and so forth, and since the bodies can be recycled as resin by remelting after use thus to save resources, the present invention is extremely useful.

Second Form of Implementation of the Invention

A forming agent 4,4'-oxy bis (benzene sulfonyl hydrazide), preferably in an amount of 1 to 30 parts by weight is added to 100 parts by weight of a polyethylene resin, where necessary along with a filler and pigment or the like to provide a kneadable composition. The composition is then kneaded using a heated mixing roll, compression kneader, extruder or the like.

In the present invention as well, in order to improve the physical properties of a composition used, to function as a nucleator (to uniform and to make fine cells), to improve defoaming and to reduce the cost, one or more additives (bulking agent or filler) may if necessary be added that do not much adversely affect the decomposition reactions of the foaming agent and that do not crosslink the resin, for example, a metal oxide such as zinc oxide, titanium oxide, calcium oxide, magnesium oxide or silicon oxide, a carbonate such as magnesium carbonate or calcium carbonate, or a fibrous material such as pulp, any of various dyes, pigments, fluorescent materials and rubber compounding ingredients of common use and so forth.

A foamable composition that is obtained in a manner as described above is loaded into a mold and under a pressure applied by a press is heated to a temperature in excess of a melting point of the resin and thereby shaped. This heat-shaping process is a process step by which the composition acquires a given shape and in which the foaming agent 4,4'-oxy bis (benzene sulfonyl hydrazide) does not materially decompose. Although a very small amount of the foaming agent initially decomposes to an extent that the formed body expands twice in volume when removed from the mold, this is far from the concept of foaming and has no objection to the present invention.

Subsequent heating of the foamable composition so formed as described above under an atmospheric pressure decomposes the foaming agent 4,4'-oxy bis (benzene sulfonyl hydrazide). This heating under the atmospheric pressure may be carried out in a hot-air temperature controlled bath, by heating with a heater attached fast to the outer surface of a metal plate, by jacket heating with a vapor or heated oil, or in an oil, metal or salt bath.

The temperature for heating is set in a range, preferably of 140 to 180° C., more preferably of 145 to 175° C., depending on the type of a resin used. The time period for heating is preferably from 5 to 40 minutes, more preferably from 10 to 35 minutes. A decomposed residue of 4,4'-oxy bis (benzene sulfonyl hydrazide) tends to blacken at high temperature for long time period. Thus, heating the composition at a higher temperature and/or for a longer time period than those mentioned above blackens a resultant cellular body.

In this manner, a cellular body is obtained that has a cell membrane that can readily be ruptured if the cellular body is mechanically deformed.

A thus obtained cellular body with closed cells is next compressed and deformed using, for example, even speed rolls whereby the cell membranes are broken and an open cell cellular body is obtained with the interconnection of cells. The even speed rolls may have on their surfaces a quite large number of needles, or may be provided in their front and/or back with a roll or rolls having a very large number of needles on their surface so that the these needles puncture a countless number of holes in the surface of the foam therewith, thereby facilitating interconnection of the cells.

Measuring thus obtained open cell cellular bodies with an air comparison type density meter model 1000 of Tokyo Science Inc. complying with ASTM D 2856 indicates a degree of cell interconnection of 100% or nearly 100%.

A polyethylene resin open cell cellular body produced by a method as described above is irradiated, according to this form of implementation of the present invention, with an ionized radiation. While ionized radiations generally include α, β, γ, X, accelerated proton, electron and neutron rays or beams, use is typically made here of a high energy electron beam irradiator. For instance, the cellular body may be irradiated, preferably at a temperature of 0 to 50° C., with a dose of 1 rad to 50 Mrad at a dose rate of 1 rad/second to 2 Mrad/second, thereby improving its heat resistance.

According to this form of implementation of the present invention, an open cell cellular body produced by the method described can also have its heat resistance improved by irradiating a cellular body having cells isolated prior to their interconnection.

In this form of implementation of the invention, irradiation with a beam of electrons becomes essential since a cellular body unless irradiated with an electron beam melts if left in the air oven at 160° C. for a period of 22 hours.

Examples of Second Form of Implementation of the Invention

While the present invention in this form of implementation is hereinafter described in further detail specifically with respect to certain examples thereof summarized in Table 3 given and comparative examples summarized in Table 4 given below Table 3, it should be noted that these Examples are intended in no way to limit the present invention.

EXAMPLE 6

A composition made of 100 parts by weight of a polyethylene resin specified by trade name: Karnel KS240 manufactured by Nippon PolyChem Kabushiki Kaisha, having a density (D) of 0.880 g/cm3, an MFR of 2.2 g/(10 minutes) and a melting point of 60° C., which is derived from polymerization of ethylene catalyzed by a metallocene, and 10 parts by weight of 4,4'-oxy bis (benzene sulfonyl hydrazide) specified by trade name: Neocellbon N#5000 manufactured by Eiwa Kasei Kogyo Kabushiki Kaisha, having a temperature of decomposition of 159° C. is kneaded using a mixing roll at a temperature of 85° C. The resultant composition is filled in a mold (5×200×200 mm) in a press heated to 110° C. and on closure is heated at this temperature for a period of 2 minutes for shaping, yielding a foamable sheet that is then cooled to a room temperature and removed from the mold.

The shaped foamable sheet is placed on a metal plate covered thin with a talc powder and is heated at a temperature of 160° C. for a period of 20 minutes in a circulating air oven to obtain a cellular body.

The cellular body obtained is passed twice between even speed rolls with a set spacing of 2 mm to break cell membranes and thus to interconnect the cells therein. An open cell cellular body thus obtained has a size of 11×470× 470 mm, an apparent density of 0.073 g/cm$^3$ and a degree of cell interconnection of 100%, and shows a uniform distribution of cells.

The open cell cellular body obtained is placed on a conveyer and is irradiated twice with a beam of electrons of 800 Kev, 16 mA and a dose rate of 4.6×10$^5$ rad/second at a room temperature from a Cockcroft-Walton accelerator in a dose of 10 Mrad.

After this treatment by irradiation, the open cell cellular body is left at a temperature of 160° C. in the air oven according to JIS K 6767 for a period of 22 hours. A degree of change in its size caused by heating is measured and found to be −4%, showing excellent resistance to heat distortion.

EXAMPLE 7

This Example is carried out in the same blending and foaming conditions as Example 6 except that 4,4'-oxy bis (benzene sulfonyl hydrazide) in Example 6 has 20 parts by weight.

An open cell cellular body obtained in this Example has a size of 12×550×550 mm, an apparent density of 0.049 g/cm$^3$ and a degree of cell interconnection of 100%, and shows a cell distribution that is substantially uniform. The open cell cellular body is treated and measured in the same way as in Example 6, and a degree of change in its size caused by heating is found to be −3.6%, showing excellent resistance to heat distortion.

EXAMPLE 8

This Example is carried out in the same blending and foaming conditions as Example 6 except that the resin used in Example 6 is replaced by an ethylene acetate copolymer specified by trade name Novatec LV540 manufactured by Nippon PolyChem Kabushiki Kaisha, having a density of 0.942 g/cm3, an MFR of 2.5 g/(10 minutes), a melting point of 83° C. and a content of vinyl acetate of 20% by weight, that 4,4'-oxy bis (benzene sulfonyl hydrazide) used in Example 6 has 10 parts by weight and that a cellular body with closed cells is passed ten times between the even speed rolls with the same spacing as in Example 6.

An open cell cellular body obtained in this Example has a size of 20×360×360 mm, an apparent density of 0.062 g/cm$^3$ and a degree of cell interconnection of 95%, and shows a cell distribution that is substantially uniform. The open cell cellular body is treated and measured in the same way as in Example 6, and a degree of change in its size caused by heating is found to be −3%, showing excellent resistance to heat distortion.

EXAMPLE 9

This Example is carried out in the same blending and foaming conditions as Example 6 except that the resin used in Example 6 is replaced by an ethylene acetate copolymer specified by trade name Novatec LV540 manufactured by Nippon PolyChem Kabushiki Kaisha, having a density of 0.942 g/cm$^3$, an MFR of 2.5 g/(10 minutes), a melting point of 83° C. and a content of vinyl acetate of 20% by weight, that 4,4'-oxy bis (benzene sulfonyl hydrazide) used in Example 6 has 20 parts by weight and that a cellular body with closed cells is passed twice between the even speed rolls with the same spacing as in Example 6.

An open cell cellular body obtained in this Example has a size of 21×460×460 mm, an apparent density of 0.043 g/cm$^3$ and a degree of cell interconnection of 100%, and shows a cell distribution that is substantially uniform. The open cell cellular body is treated and measured in the same way as in Example 6, and a degree of change in its size caused by heating is found to be −6%, showing excellent resistance to heat distortion.

EXAMPLE 10

A composition made of 100 parts by weight of high pressure low density polyethylene specified by trade name Novatic LE-425 manufactured by Nippon PolyChem Kabushiki Kaisha, having a density of 0.923 g/cm$^3$, an MFR of 2.0 g/(10 minutes) and a melting point of 111° C. and 10 parts by weight of 4,4'-oxy bis (benzene sulfonyl hydrazide) as mentioned before is kneaded using a mixing roll heated to 110° C. The resultant composition is filled in a mold (5×200×200 mm) in a press heated to 115° C. and on closure is heated at this temperature for a period of 5 minutes for shaping, yielding a foamable sheet that is then cooled to a room temperature and removed from the mold.

The shaped foamable sheet is placed on a metal plate covered thin with a talc powder and is heated at a temperature of 160° C. for a period of 20 minutes in a circulating air oven to obtain a cellular body.

The cellular body obtained is passed four times between even speed rolls with a set spacing of 2 mm to break cell membranes and thus to interconnect the cells therein. An open cell cellular body thus obtained has a size of 14×400×400 mm, an apparent density of 0.072 g/cm$^3$ and a degree of cell interconnection of 95% and shows a uniform distribution of cells.

The open cell cellular body obtained is placed on a conveyer and is irradiated twice with a beam of electrons of 800 keV, 16 mA and a dose rate of 4.6×10$^5$ rad/second at a room temperature from a Cockcroft-Walton accelerator in a dose of 10 Mrad.

After this treatment by irradiation, the open cell cellular body is left at a temperature of 160° C. in the air oven according to JIS K 6767 for a period of 22 hours. A rate of change in its size caused by heating is measured and found to be −5.6%, showing excellent resistance to heat distortion.

EXAMPLE 11

This Example is carried out in the same blending and foaming conditions as Example 10 except that 4,4'-oxy bis (benzene sulfonyl hydrazide) in Example 10 has 20 parts by weight and that a cellular body with isolated cells is passed four times between the even speed rolls with the same spacing as in Example 10.

An open cell cellular body obtained in this Example has a size of 18×540×540 mm, an apparent density of 0.044 g/cm$^3$ and a degree of cell interconnection of 100%, and shows a cell distribution that is substantially uniform. The open cell cellular body is treated and measured in the same manner as in Example 10, and a degree of change in its size caused by heating is found to be −8.8%, showing excellent resistance to heat distortion.

EXAMPLE 12

This Example is carried out in the same blending and foaming conditions as Example 6 except that a cellular body obtained in the same as in Example 6 prior to, rather than after, cell interconnection, is irradiated with an ionized radiation to get an excellent resistance to heat distortion and thereafter is mechanically processed in the same manner as in Example 6 to acquire cells interconnected. A thus obtained open cell cellular body when measured in the same manner as in Example 6 shows the same properties as the body obtained there.

EXAMPLE 13

This Example is carried out in the same blending and foaming conditions as in Example 7 except that a cellular body obtained in the same as in Example 7 prior to cell interconnection, is irradiated with an ionized radiation to get an excellent resistance to heat distortion and thereafter is mechanically processed in the same manner as in Example 7 to acquire cells interconnected. A thus obtained open cell cellular body when measured in the same manner as in Example 7 shows the same properties as the body obtained there.

COMPARATIVE EXAMPLE 2

This Example is carried out in the same blending and foaming conditions as Example 6 except that 10 parts by weight of 4,4'-oxy bis (benzene sulfonyl hydrazide) used in Example 6 is replaced by 6.0 parts by weight of azodicarbonamide, and 1.0 parts by weight of zinc oxide is added to composition. An open cell cellular body is irradiated with an ionized radiation in the same way as in Example 6, but when left in the air oven at 160° C. for a period of 22 hours becomes melted.

COMPARATIVE EXAMPLE 3

This Example is carried out in the same blending and foaming conditions as Example 6 except that in place of 10 parts by weight of 4,4'-oxy bis (benzene sulfonyl hydrazide) used in Example 6, 12 parts by weight of sodium bicarbonate is added to composition. An open cell cellular body is irradiated with an ionized radiation in the same way as in Example 6, but when left in the air oven at 160° C. for a period of 22 hours becomes melted.

TABLE 3

| Example | | 6 | 7 | 8 | 9 | 10 | 11 |
|---|---|---|---|---|---|---|---|
| Resin | Type | Metallocene type PE | | EVA | | LDPE | |
| | Grade | Karnel KS240 | | Novatec LV540 | | Novatec LE425 | |
| | Density (g/cm³) | 0.880 | | 0.942 | | 0.923 | |
| | MFR(g/10 min.) | 2.2 | | 2.5 | | 2.0 | |
| | Melting Point (° C.) | 60 | | 83 | | 111 | |
| | VAC (%) | — | | 20 | | — | |
| OBSH blending parts in number | | 10 | 20 | 10 | 20 | 10 | 20 |
| Shaping conditions | Mold size (mm × mm × mm) | 5 × 200 × 200 mm | | | | | |
| | Heating temperature | 110° C. | | | | | |
| | Heating time period | 2 minutes | | | | 5 minutes | |
| Foaming conditions | Heating temperature | 160° C. | | | | | |
| | Heating time period | 20 minutes | | | | | |
| Cell interconnection | Roll spacing | 2 mm | | | | | |
| | Number of passages | 2 | 10 | 2 | 4 | 4 | |
| Open cell cellular body | Size (mm × mm × mm) | 11 × 470 × 470 | 12 × 550 × 550 | 20 × 360 × 360 | 20 × 460 × 460 | 14 × 400 × 400 | 18 × 540 × 540 |
| | Apparent density (g/cm³) | 0.073 | 0.049 | 0.062 | 0.043 | 0.072 | 0.044 |
| | Degree of cell continuity % | 100 | 100 | 95 | 100 | 95 | 100 |
| Degree of change in size by heating (%) At 160° C. | | −4 | −3.6 | −3 | −6 | −5.6 | −8.8 |

TABLE 4

| Comparative Example | | 2 | 3 |
|---|---|---|---|
| Resin | Type | Metallocene type PE | Metallocene type PE |
| | Grade | Karnel KS240 | Karnel KS240 |
| | Density (g/cm³) | 0.880 | 0.880 |
| | MFR(g/10 min.) | 2.2 | 2.2 |
| | Melting Point (° C.) | 60 | 60 |
| | VAC (%) | — | — |
| OBSH blending parts in number | | 0 | 0 |
| Azodicarbonamide blending parts in number | | 6.0 | 0 |
| Zinc oxide blending parts in number | | 0 | 12.0 |
| Zinc stearate blending parts in number | | 1.0 | 0 |
| Shaping conditions | Mold size (mm × mm × mm) | 5 × 200 × 200 mm | |
| | Heating temperature | 110° C. | |
| | Heating time period | 2 minutes | |
| Foaming conditions | Heating temperature | 160° C. | |
| | Heating time period | 20 minutes | |
| Cell interconnection | Roll spacing | 2.0 mm | 2.0 mm |
| | Number of passages | 2 | 2 |
| Open cell cellular body | Size (mm × mm × mm) | 11 × 320 × 320 | 11 × 320 × 320 |
| | Apparent density (g/cm3) | 0.118 | 0.092 |
| | Degree of cell interconnection (%) | 100 | 100 |
| Degree of change in size by heating (%) At 160° C. | | Melted | Melted |

It is seen that according to the present invention, the use as a foaming agent of 4,4'-oxy bis (benzene sulfonyl hydrazide) coupled with treatment by ray irradiation permits yielding a polyethylene resin open cell cellular body that is maximum in a degree of the cell interconnection and has good resistance to heat distortion. Since polyethylene resin open cell cellular bodies that the method of this invention yields are thus highly suitable for use as an interior material in an automobile, filters, carriers in a clarifier tank and as an anti-condensation material in an air-conditioner and so forth.

Although the present invention has been described in terms of the presently preferred embodiments as applied to a method of making an open cell cellular body, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method of making a polyethylene resin open cell cellular body, comprising the steps of:
    adding 4,4'-oxybis(benzenesulfonylhydrazide) to a polyethylene resin material to form a foamable composition and shaping the foamable composition of polyethylene resin material;
    heating the shaped foamable composition of polyethylene resin material to be foamed under an atmospheric pressure to form a cellular body thereof with cells therein; and
    mechanically deforming said cellular body polyethylene resin material to cause the cells to be interconnected therein, thereby producing a non-cross-linked open cell cellular body of polyethlene resin material.

2. A method of making a polyethylene resin open cell cellular body as set forth in claim 1, wherein said polyethylene resin material is a polyethylene resin that is derived by polymerization of ethylene catalyzed by a metallocene compound.

3. A method of making a polyethylene resin open cell cellular body as set forth in claim 1, wherein said polyethylene resin material is an ethylene-vinyl acetate copolymer.

4. A method of making a polyethylene resin open cell cellular body as set forth in claim 3, wherein said ethylene-vinyl acetate copolymer contains not less than 5% of vinyl acetate.

5. A method of making a polyethylene resin open cell cellular body as set forth in claim 1, wherein said cellular body is freely formed in three-dimensional directions under the atmospheric pressure.

6. A method of making a polyethylene resin open cell cellular body as set forth in claim 2, wherein said cellular body is freely formed in three-dimensional directions under the atmospheric pressure.

7. A method of making a polyethylene resin open cell cellular body as set forth in claim 3, wherein said cellular body is freely formed in three-dimensional directions under the atmospheric pressure.

8. A method of making a polyethylene resin open cell cellular body as set forth in claim 4, wherein said cellular body is freely formed in three-dimensional directions under the atmospheric pressure.

9. A method of making a polyethylene resin open cell cellular body as set forth in claim 1, further comprising a step of irradiating the produced open cell cellular body of polyethylene resinous material after mechanical deformation, with a beam of electrons, thereby rendering the produced open cell cellular body of polyethylene heat-resistant or resistant to heat distortion.

10. A method of making a polyethylene resin open cell cellular body as set forth in claim 1, further comprising a step of rendering the produced open cell cellular body of polyethylene resin material heat-resistant or resistant to heat distortion by irradiating said formed cellular body after forming said cellular body, with a beam of electrons.

11. A method of making a polyethylene resin open cell cellular body as set forth in claim 1, wherein the heating is carried out at a temperature of 140 to 180° C.

12. A method of making a polyethylene resin open cell cellular body as set forth in claim 1, wherein the heating is carried out at a temperature of 145 to 175° C.

13. A method of making a polyethylene resin open cell cellular body as set forth in claim 11, wherein the heating is carried out for 5 to 40 minutes.

14. A method of making a polyethylene resin open cell cellular body as set forth in claim 11, wherein the heating is carried out for 10 to 35 minutes.

15. A method of making a polyethylene resin open cell cellular body as set forth in claim 12, wherein the heating is carried out for 10 to 35 minutes.

16. A method of making a polyethylene resin open cell cellular body as set forth in claim 9, wherein the irradiating is carried out at a temperature of 0 to 50° C., with a dose of 1 rad to 50 Mrad at a dose rate of 1 rad/second to 2 Mrad/second.

17. A method of making a polyethylene resin open cell cellular body as set forth in claim 10, wherein the irradiating is carried out at a temperature of 0 to 50° C., with a dose of 1 rad to 50 Mrad at a dose rate of 1 rad/second to 2 Mrad/second.

* * * * *